(12) United States Patent
Bourlon

(10) Patent No.: US 11,466,763 B2
(45) Date of Patent: Oct. 11, 2022

(54) LOW-COST NUT FOR VEHICLE BRAKING SYSTEM

(71) Applicant: Foundation Brakes France SAS, Drancy (FR)

(72) Inventor: Philippe Bourlon, Dammartin en Goele (FR)

(73) Assignee: Foundation Brakes France SAS

( * ) Notice: Subject to any disclaimer, the term of this patent is extended or adjusted under 35 U.S.C. 154(b) by 0 days.

(21) Appl. No.: 16/097,031

(22) PCT Filed: Apr. 24, 2017

(86) PCT No.: PCT/FR2017/050961
§ 371 (c)(1),
(2) Date: Oct. 26, 2018

(87) PCT Pub. No.: WO2017/187068
PCT Pub. Date: Nov. 2, 2017

(65) Prior Publication Data
US 2019/0145505 A1    May 16, 2019

(30) Foreign Application Priority Data
Apr. 26, 2016   (FR) ...................................... 1653664

(51) Int. Cl.
*F16H 25/24*      (2006.01)
*F16D 65/18*      (2006.01)
(Continued)

(52) U.S. Cl.
CPC ............. *F16H 25/24* (2013.01); *B21D 53/88* (2013.01); *B60T 13/741* (2013.01);
(Continued)

(58) Field of Classification Search
CPC ...... F16D 55/226; F16D 65/18; F16D 65/183; F16D 2121/14; F16D 2125/40;
(Continued)

(56) References Cited

U.S. PATENT DOCUMENTS 3,097,814 A * 7/1963 Sarah ................. A01K 89/0275
                                                192/93 A
3,556,270 A * 1/1971 Comment ............ B60W 10/04
                                                477/191
(Continued)

FOREIGN PATENT DOCUMENTS

CN     202188092 U    4/2012
CN     103210231 A    7/2013
(Continued)

OTHER PUBLICATIONS

China National Intellectual Property Administration, Search Report of the Second Office Action for Application No. 201780025962.4; 6 pages; dated Apr. 16, 2020.

*Primary Examiner* — Melody M Burch
(74) *Attorney, Agent, or Firm* — St. Onge Steward Johnston & Reens LLC

(57) ABSTRACT

A method for manufacturing a vehicle braking system including the steps of machining a hub so as to provide it with a nose and a tapped hole, mounting, on the nose of the hub, a ring having at least one relief extending in a direction perpendicular to a main axis of the ring, and rigidly attaching the ring to the hub such that the assembly, including the hub and the ring, forms a nut.

18 Claims, 4 Drawing Sheets

(51) Int. Cl.
*F16D 55/226* (2006.01)
*B60T 13/74* (2006.01)
*B21D 53/88* (2006.01)
*B60T 1/06* (2006.01)
*F16D 121/14* (2012.01)
*F16D 125/40* (2012.01)

(52) U.S. Cl.
CPC .......... *F16D 55/226* (2013.01); *F16D 65/18* (2013.01); *F16D 65/183* (2013.01); *B60T 1/065* (2013.01); *F16D 2121/14* (2013.01); *F16D 2125/40* (2013.01); *F16D 2200/0021* (2013.01); *F16D 2250/0084* (2013.01); *F16H 2025/2481* (2013.01)

(58) Field of Classification Search
CPC ..... F16D 2200/0021; F16D 2250/0084; F16H 25/24; F16H 2025/2481; B60T 13/741; B60T 1/065; B21D 53/88
See application file for complete search history.

(56) References Cited

U.S. PATENT DOCUMENTS

| | | | |
|---|---|---|---|
| 4,934,107 A * | 6/1990 | MacKay, Jr. | B24D 7/16 15/230.18 |
| 2004/0033144 A1 * | 2/2004 | Rush | F04B 1/128 417/223 |
| 2005/0060870 A1 * | 3/2005 | Exposito | B23P 11/00 29/592 |
| 2005/0247528 A1 * | 11/2005 | Schack | F16D 55/226 188/72.8 |
| 2010/0172606 A1 * | 7/2010 | Lunz | B21D 53/10 384/490 |
| 2012/0325597 A1 * | 12/2012 | Giering | F16D 65/14 188/72.3 |
| 2013/0206518 A1 * | 8/2013 | Vinck | F16D 55/226 188/72.4 |
| 2013/0206519 A1 | 8/2013 | Vinck et al. | |
| 2014/0158480 A1 * | 6/2014 | Qian | B60T 1/065 188/72.6 |
| 2014/0262635 A1 * | 9/2014 | Vinck | F16D 55/226 188/72.6 |

FOREIGN PATENT DOCUMENTS

| | | |
|---|---|---|
| CN | 103562583 A | 2/2020 |
| DE | 102010008927 A1 | 8/2011 |
| EP | 0272389 A2 | 6/1988 |
| GB | 1179235 A | 1/1970 |
| JP | 60169700 A * | 9/1985 |

* cited by examiner

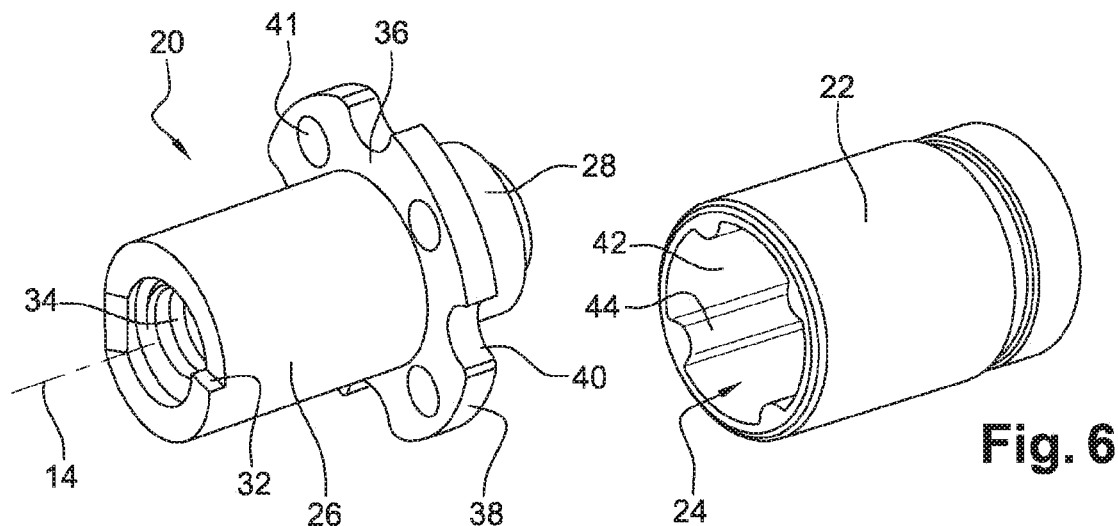
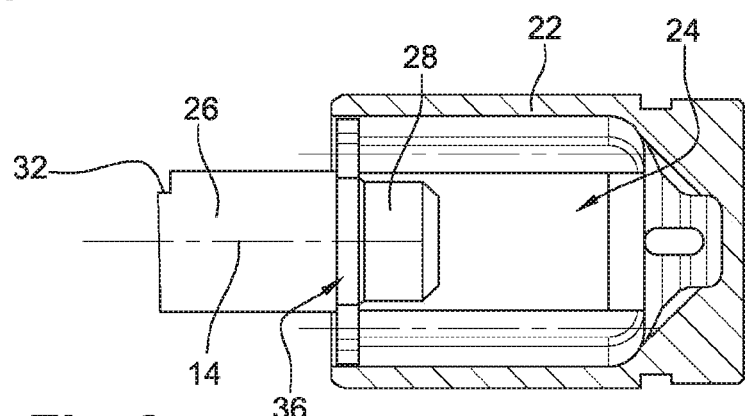
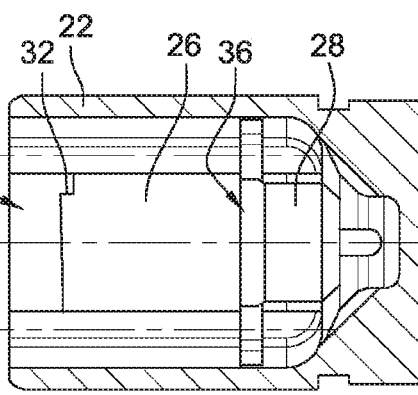
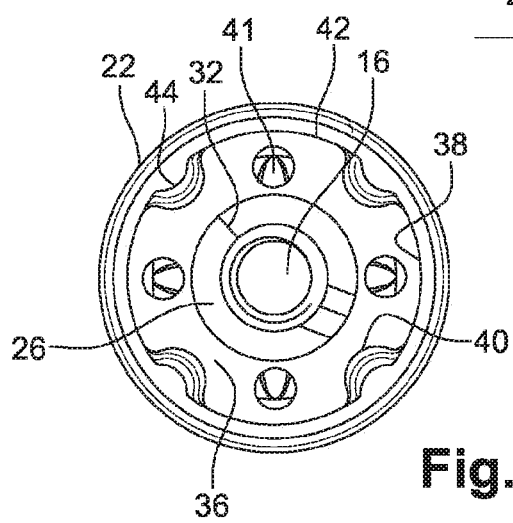

LOW-COST NUT FOR VEHICLE BRAKING SYSTEM

FIELD OF THE INVENTION

The invention relates to a nut for a vehicle braking system.

BACKGROUND OF THE INVENTION

A braking system, for example a disc braking system more commonly called a "disc brake" or a drum braking system more commonly called a "drum brake", generally comprises friction means connected to an actuation member adapted to move the friction means towards a braking member attached to a vehicle wheel. The objective is to place the friction means in contact with the braking member to brake the vehicle by friction or to move them away from the friction member in order to stop braking. The actuation member is generally coupled to transmission means intended to drive the displacement of the friction means using the energy supplied by the actuation member. When the braking system is a disc brake, the friction means consist of brake pads and the braking member consists of a disc attached to the wheel. When the braking system is a drum brake, the friction means consist of at least one shoe with a brake lining and the braking member consists of a drum attached to the wheel.

Transmission means composed of the assembly of a nut and a screw housed in the nut are known. The screw comprises on an external side a thread adapted to cooperate with a tapped hole of the nut. The actuation member turns the screw, which generates a helical movement of the nut relative to the screw and causes the nut to slide relative to the actuation member.

To manufacture the nut, it is known to strike, machine, grind and temper a block of material to form a generally cylindrical hub having at least one relief extending in a direction perpendicular to a main axis of the nut. This relief is intended to cooperate with a wall of a piston in which the nut is slidably mounted to prevent any rotation of the nut relative to the piston. It also converts the rotational movement of the screw into a sliding movement of the nut.

This nut is interesting but has some disadvantages. Since the nut is made in one piece from a single block of material, the presence of the relief generates significant losses of material during manufacture. Since the material removed from the block cannot generally be used, this generates an additional cost when manufacturing the nut. This manufacture involves implementing a large number of operations and requires suitable equipment, which also generates an additional cost when manufacturing the nut. These disadvantages are particularly noticeable when the nut is small and/or the piston diameter is large. Such nuts are intended to withstand, during braking, reduced forces which are disproportionate compared with their manufacturing cost.

SUMMARY OF THE INVENTION

One object of the invention is to provide a low-cost nut.
Thus, the invention provides for a method to manufacture a vehicle braking system, wherein:
- a hub is machined so as to provide it with a nose and a tapped hole,
- a ring having at least one relief extending in a direction perpendicular to a main axis of the ring is mounted on the nose of the hub, and
- the ring is rigidly attached to the hub such that the assembly consisting of the hub and the ring forms a nut.

Thus, the nut comprises two different elements manufactured separately. The most suitable means can therefore be used to manufacture these elements in order to reduce the overall cost of manufacturing the assembly. Thus, it is also possible to better control, in other words reduce, the material losses generated when manufacturing the nut. In addition, since the nut is designed in two separate elements it can be adapted, if necessary, to different screws. The same hub model can therefore be used for different braking device models. Similarly, the same ring model can be used for different braking device models. In particular, the dimensions of the ring can be chosen, independently of the hub, according to the stresses to which the nut will be subjected during use. The ring must be attached to the hub rigidly enough to withstand the rotational torque generated when applying force on a piston into which the hub and the ring extend.

Advantageously, the ring is manufactured by machining a metal sheet.

Advantageously, the hub is manufactured by machining a steel bar, preferably pretreated.

Thus, the ring and the hub are easy to manufacture, from inexpensive raw materials widely available on the market. In addition, the shape of a steel bar is similar to that required for the hub once machined, which limits the material losses and simplifies manufacture.

Advantageously, when machining, at least one set of teeth is produced on the nose of the hub.

It is therefore easy to rigidly attach the ring to the hub. The inner diameter of the ring simply has to be slightly less than an outer diameter of the nose of the hub for the teeth to rigidly attach the ring to the hub. The method of attaching the parts together increases the manufacturing tolerances, and therefore reduces the costs, compared with a forced assembly with no teeth. The tolerance range is for example 50 µm.

Advantageously, the ring is made of a material whose hardness, for example Vickers hardness, is less than that of a material in which the hub is made.

The ring can therefore be mounted on the hub by simple forced assembly. In particular, if the nose of the hub is provided with teeth, the teeth can penetrate into the ring to improve the rigid attachment of the ring to the hub.

Advantageously, an axial end of the hub is provided with a shoulder.

This shoulder forms a travel limit stop for the nut. Consequently, there is no need to provide a separate member whose sole purpose is to form a travel limit stop for the nut, which simplifies the design of the braking system.

Advantageously, the ring is mounted on the nose of the hub by shrink-fitting or knurling.

These simple assembly methods improve the control of the method for manufacturing the braking system.

The invention also provides for a nut manufactured using a method as described above.

The invention also provides for an assembly comprising a nut as described above and a piston having a duct whose shape is complementary to that of the ring.

Due to the duct whose shape is complementary to that of the ring, the nut is slidably mounted in the duct. The ring is also simply prevented from rotating relative to the piston.

The invention also provides for a vehicle braking system comprising an assembly as defined above.

BRIEF DESCRIPTION OF THE DRAWINGS

We will now describe an embodiment of the invention using the attached drawings, in which:

FIG. 5 is a perspective view of the nut in the assembled state, FIG. 6 is a perspective view of the piston of FIG. 2, FIG. 7 is a cross-sectional view of the assembly in the assembled state, and FIGS. 8 and 9 illustrate respectively driving and braking positions that the nut can take in the piston.

DETAILED DESCRIPTION OF THE INVENTION

Figure 1:
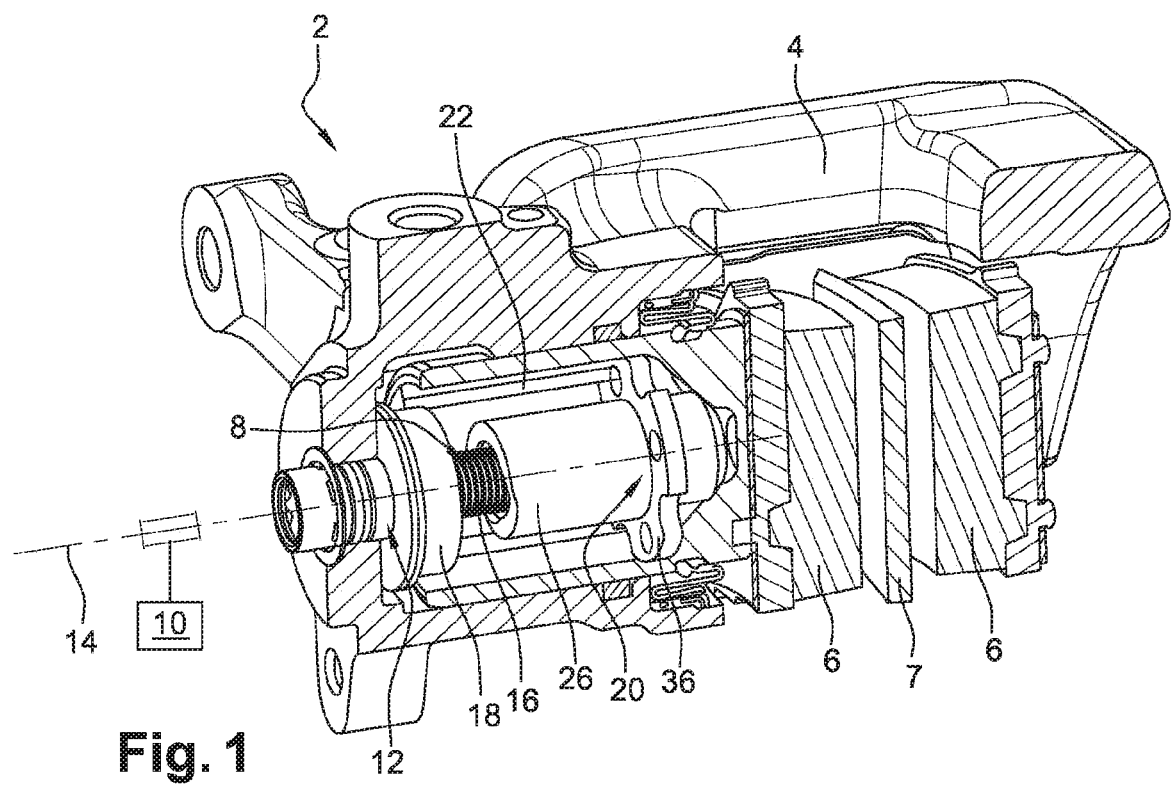
FIG. 1 is a perspective and cross-sectional view of a braking system according to the invention.

FIG. 1 shows a braking system 2 according to the invention. The system 2 comprises a box 4 attached to a chassis of a vehicle in which the system 2 is installed, and friction means 6 slidably mounted relative to the box 4. The friction means 6 are formed in this case by two pads intended to come into contact with opposite sides of a disc 7 attached to a vehicle wheel (not shown), the disc 7 extending partially between the two pads 6. We will describe below how the braking system 2 slows down the vehicle. In this case, the system 2 has a traditional configuration with floating caliper. This configuration will be described below.

Figure 2:
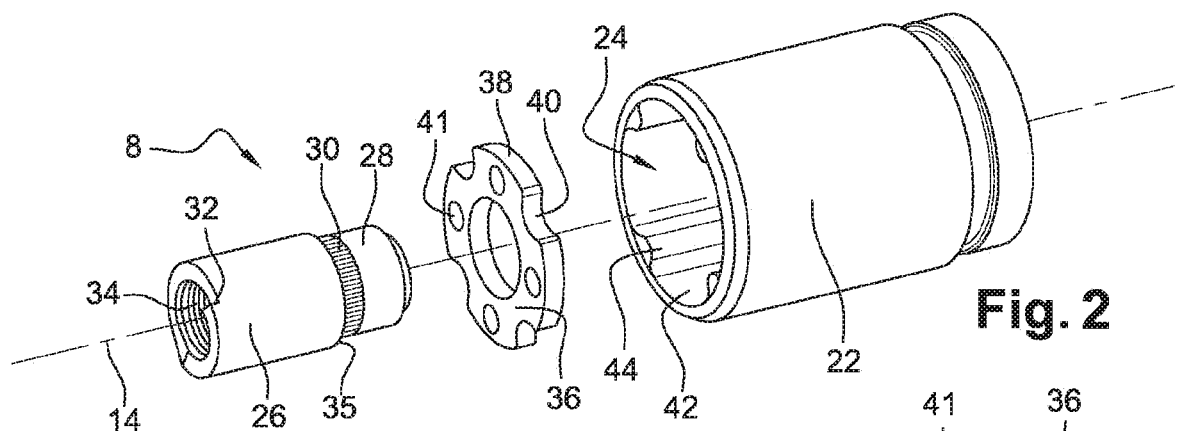
FIG. 2 is an exploded view of an assembly, according to the invention, comprising a nut and a piston, included in the braking system of FIG. 1.

The system 2 comprises an assembly 8 intended to convert a torque produced by a motor 10 into a sliding movement of the pads 6 towards the disc 7 and a tightening action on the disc. The assembly 8 and its components are illustrated in particular on FIG. 2.

The assembly 8 comprises a screw 12 coupled to the motor 10 so that a torque produced by the motor 10 drives the screw 12 in rotation relative to the box 4 about a main axis 14 of the screw 12. The screw comprises a threaded rod 16 and a crown 18 attached to the rod 16. The crown 18 forms a head of the screw 12.

The assembly 8 comprises a nut 20 mounted fixed in rotation relative to the box 4 and movably by sliding relative thereto along the axis 14. It is coupled with the screw 12 by their mutual threads so that the screw 12 and the nut 20 form a helical connection. This helical connection is preferably irreversible. This means that rotation of the screw 12 can cause the nut 20 to slide relative to the screw 12, but that a force acting on the nut 20 to make it slide cannot drive the screw 12 in rotation in return. This makes the assembly 8 safer since it is generally not designed to convert a translational movement into a rotational movement.

The assembly 8 comprises a piston 22 slidably mounted parallel to the axis 14 relative to the box 4 and having a duct or housing 24 into which the screw 12 and the nut 20 extend. The piston 22 is rigidly attached to the nearer of the two pads 6. This pad is thus slidably mounted parallel to the axis 14 relative to the box 4. The piston 22 and the duct 24, illustrated on FIG. 6, will be described below.

We will now describe the nut 20 in more detail.

Figure 3:
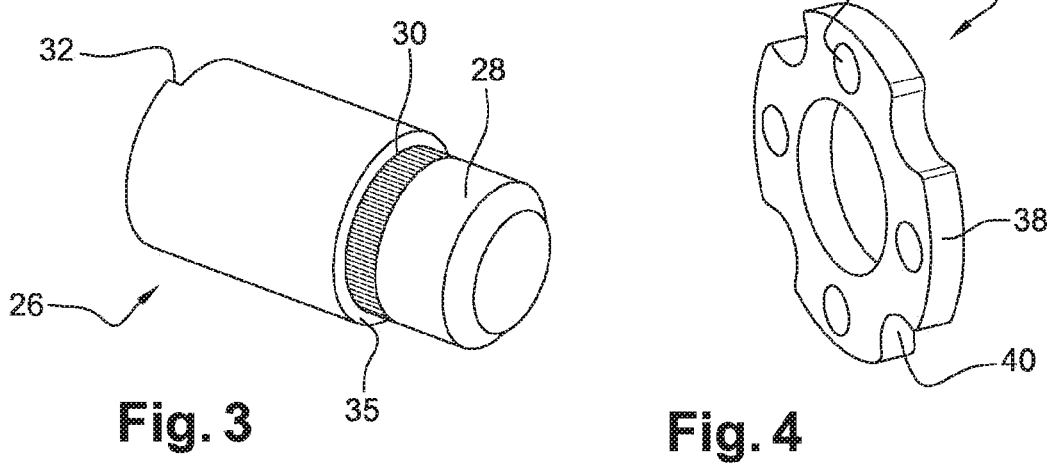
FIG. 3 is a perspective view of a hub of the nut illustrated on FIG. 2.

It comprises a hub 26 having a main axis coincident with the main axis 14 of the screw 12, thus forming a main axis of the assembly 8. The hub 26 is illustrated in particular on FIG. 3. It is machined at an axial end portion distant from the crown 18, called the distal end, to form a nose 28 of the hub 26. At least one set of teeth 30 forming a knurled area is produced on a portion of the nose 28. The purpose of this set of teeth 30 will be described below. In this case, the knurling is straight, not oblique.

The hub 26 has at its other axial end portion, called the proximal end, a circumferential shoulder 32 intended to cooperate with a complementary shoulder of the crown 18 to form a travel limit stop of the nut 20. As can be seen on FIG. 5, the circumferential shoulder 32 is formed by a generally rectangular side extending in a plane parallel to the axis 14. By adjusting the shape and dimensions of the circumferential shoulder 32 or those of the crown 18, the travel of the nut 20 in the duct 24 can be determined.

The hub 26 has a tapped hole 34 intended to cooperate with the threaded rod 16 of the screw 12 to form a helical connection.

The axial end portions are separated from each other by an annular shoulder adjacent to the knurled area 30.

Figure 4:
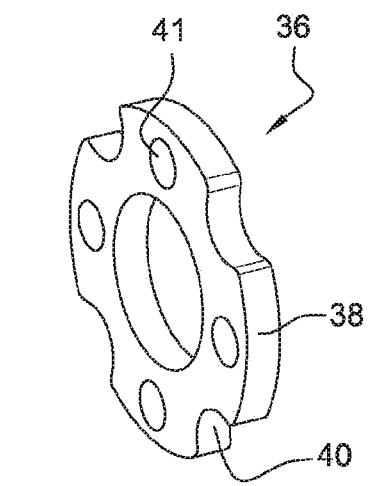
FIG. 4 is a perspective view of a ring of the nut illustrated on FIG. 2.
Figure 10:
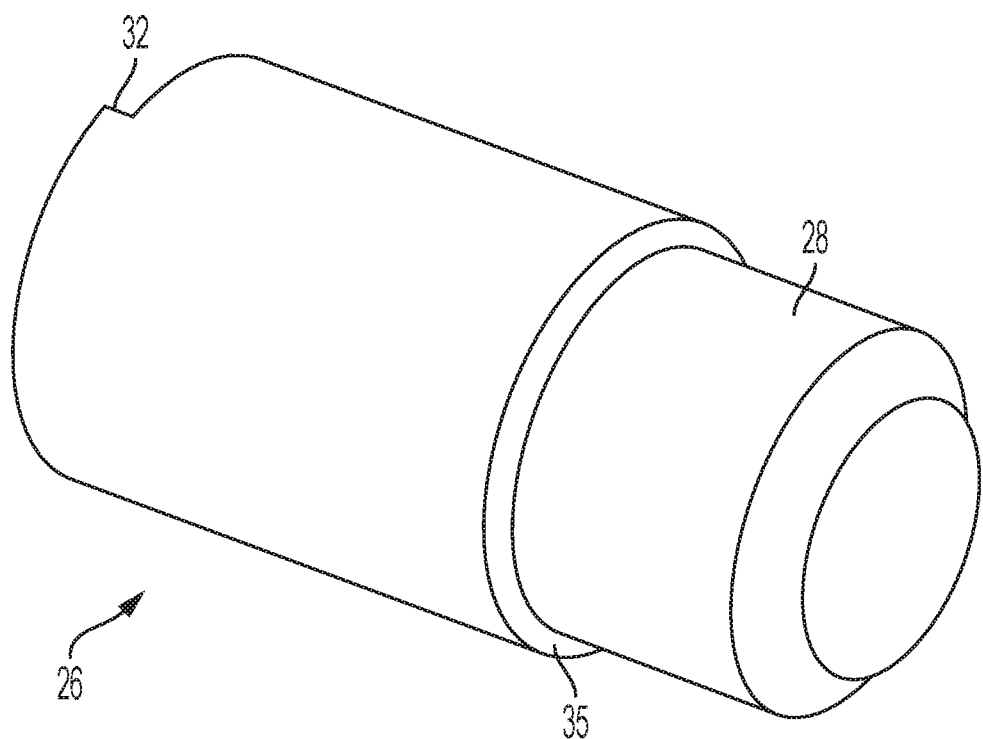
FIG. 10 is a perspective view of another embodiment of the hub and FIG. 11 is a perspective view of another embodiment of the ring.
Figure 11:
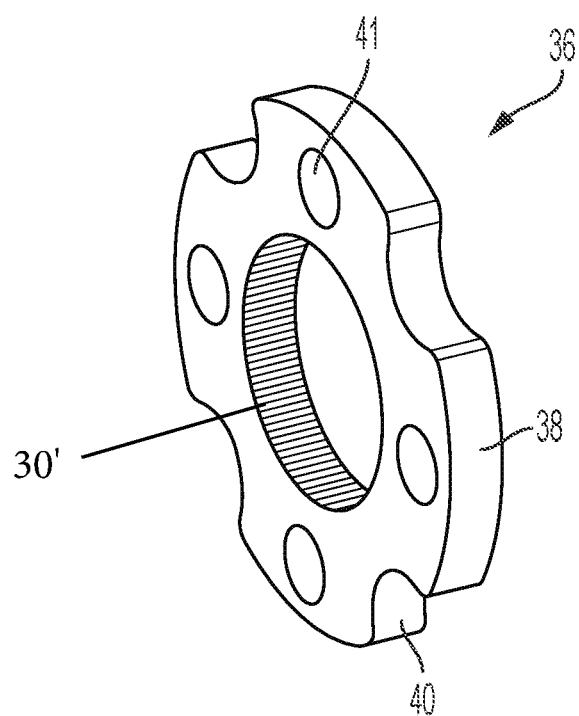

The nut 20 comprises a ring 36 having at least one relief 38 extending in a direction perpendicular to the main axis of the ring 36, which is coincident with the main axis 14. As can be seen in particular on FIG. 2, the relief 38 extends away from the main axis 14. The ring 36 shown on FIG. 4 has four rounded reliefs 38 with a recess 40 formed between each pair of reliefs. The section of the ring 36 thus has the general shape of a four-leaf clover. According to alternative embodiments of the invention, the ring has reliefs 38 whose positions and number are different from those of the ring described above.

The ring 36 has holes 41 extending in the reliefs 38 and intended to lighten the ring 36. The holes 41 cross the thickness of the ring 36 along a direction parallel to the axis 14. The number of holes 41 and their dimensions are chosen according to the stresses to which the nut 20 will be subjected during use. In this case, there are four.

The nut 20 is manufactured as follows.

The ring 36 is manufactured by machining or cutting a metal sheet.

The hub 26 is manufactured by machining a steel bar, preferably pretreated so that there is no need to treat the hub 26 whose shape is more complex than that of the steel bar. Only the parts of the steel bar intended to form the nose 28, the teeth 30, the tapped hole 34 and the circumferential 32 and annular 35 shoulders of the hub 26 are machined. The ring 36 is made of a material whose hardness, for example Vickers hardness, is less than that of a material in which the hub 26 is made.

The ring 36 is mounted on the nose 28 of the hub 26, so that an internal side of the ring 36 is in contact with the teeth 30 and against the annular shoulder 35. The ring 36 is thus mounted around the nose 28 of the hub 26, as can be seen in particular on FIG. 5. This assembly is produced by force, shrink-fitting or knurling. Due to the difference in hardness of the materials forming the hub 26 and the ring 36, the teeth 30 penetrates into the ring 36 so as to rigidly attach the ring to the hub 26. This rigid attachment prevents the ring 36 from rotating relative to the hub 26. FIG. 5 illustrates the nut 20 manufactured in this way.

Referring to FIG. 7, the shape of the duct 24 of the piston 22 is complementary to that of the ring 36. More precisely, the duct 24 has gutters or recesses 42 parallel to the axis 14 and extending towards the axis 14, receiving the reliefs 38 of the ring 36. It also has projections or longitudinal ribs 44 extending into the recesses 40 of the ring 36. Thus, the ring 36, and more generally the nut 20, is slidably mounted in the duct 24 parallel to the axis 14. Also, due to the reliefs 38, the piston 22 prevents the nut 20 from rotating relative to the piston 22.

The manufacturing steps described above are inexpensive and generate little loss of material.

We will now describe how the braking system 2 operates.

It is assumed that the vehicle is moving. The nut 20 is in the position illustrated in FIG. 8, called the driving position, and the pads 6 do not touch the disc 7. If the user wants to slow down the vehicle, he/she actuates a braking member (not shown), for example, a brake pedal of the vehicle or a button located in the vehicle passenger compartment, which controls the rotation of the motor 10 in a braking direction. The motor 10 thus drives the screw 12 in rotation relative to the box 4 about the axis 14. Since the screw 12 is engaged with the nut 20 and due to the shape of the duct 24 of the piston 22, the nut 20 is caused to slide relative to the box 4 parallel to the axis 14.

As it slides, the nut 20 finally comes into contact with an axial end of the duct 24. From this time, if the motor 10 continues to turn, the nut 20 causes the piston 22 to slide with it parallel to the axis 14. Since the proximal pad 6 is rigidly attached to the piston 20, it moves towards the disc 7 until it comes into contact with it. The nut 20 is now in the position illustrated on FIG. 9, called the braking position. The other pad 6, the distal pad, now starts to move towards the disc 7 in the opposite direction until it comes into contact with it. Since the braking system 2 has in this case a floating caliper configuration, once the proximal pad 6, in other words that attached to the piston 22, comes into contact with the disc 7, if the screw 12 continues to turn, then the distal pad 6 starts to slide parallel to the axis 14 relative to the chassis towards the disc 7. In other words, the nut 20 presses the two pads 6 against the opposite sides of the disc 7.

Since the disc 7 is attached to the wheel, the friction between the pads 6 and the disc 7 converts the kinetic energy of the wheel into heat. This decrease the speed of rotation of the wheel and therefore slows down the vehicle. Once the vehicle speed has decreased to a value required by the driver, he/she stops actuating the braking member. The latter then controls a rotation of the motor 10 in the direction opposite to the braking direction so that the nut 20 moves away from the disc 7. The pads 6 and the disc 7 are no longer in contact, so there is no longer any friction between them. The vehicle stops slowing down.

The braking system 2 could also be intended not to slow down the vehicle but to keep it stationary. In this case, the braking system 2 would be controlled by a locking member such as a handbrake also called a "parking brake". A vehicle is in fact generally equipped with first braking systems intended to cooperate with the braking member and second braking systems intended to cooperate with the locking member.

Obviously, numerous modifications can be made without leaving the scope of the invention.

An internal side of the ring could be provided with teeth 30' adapted to cooperate with the teeth of the hub to improve the rotational locking of the ring relative to the hub.

The internal side of the ring could also be provided with teeth 30' and the nose of the hub not provided with any. In this case, the ring should preferably be made of a material whose hardness, for example a Vickers hardness, is greater than that of the material in which the hub is made, such that the teeth 30' can penetrate into the hub so as to rigidly attach the ring to the hub.

PARTS LIST

2: braking system
4: box
6: pad
7: disc
8: assembly
10: motor
12: screw
14: main axis
16: rod
18: crown
20: nut
22: piston
24: duct
26: hub
28: nose
30: teeth
32: circumferential shoulder
34: tapped hole
35: annular shoulder
36: ring
38: relief
40: recess
41: hole
42: gutter
44: projection

The invention claimed is:

1. A method for manufacturing a vehicle braking system wherein:
   a hub being machined so as to provide it with a nose and a tapped hole,
   a ring, having at least one relief extending in a direction perpendicular to a main axis of the ring, is mounted on an outside of the nose of the hub, and
   the ring and hub are separate parts which are rigidly attached together to form an assembly consisting of the hub and the ring to form a nut and at least part of the nose of the hub passes through the ring wherein the rigid attachment between the hub and nut comprises an attachment which is rigid in rotation in two directions.

2. The method according to claim 1, wherein the ring is manufactured by machining a metal sheet.

3. The method according to claim 1, wherein the hub is manufactured by machining a steel bar.

4. The method according to claim 3, wherein, when machining, at least one set of teeth is produced on the nose of the hub.

5. The method according to claim 1, wherein the ring is made of a material whose Vickers hardness is less than that of a material in which the hub is made.

6. The method according to claim 1, wherein an axial end of the hub is provided with a shoulder.

7. The method according to claim 1, wherein the ring is mounted on the nose of the hub by shrink-fitting or knurling.

8. A vehicle braking system, manufactured using a method according to claim 1.

9. A vehicle braking system according to claim 8 comprising a piston having a duct whose shape is complementary to that of the ring.

10. A method of manufacturing a vehicle braking system comprising:
   a hub being machined so as to provide it with a nose and a tapped hole the hub is manufactured by machining a steel bar, and when machining, at least one set of teeth is produced on the nose of the hub, wherein the teeth are aligned substantially parallel to the main axis;

a ring, having at least one relief extending in a direction perpendicular to a main axis of the ring, is mounted on an outside of the nose of the hub;

the ring and hub are separate parts which are rigidly attached together to form an assembly consisting of the hub and the ring to form a nut, and the ring is made of a material whose Vickers hardness is less than that of a material in which the hub is made.

11. A method of manufacturing a vehicle braking system comprising:

a hub being machined so as to provide it with a nose and a tapped hole;

a ring, having at least one relief extending in a direction perpendicular to a main axis of the ring, is mounted on an outside of the nose of the hub;

at least one set of teeth is produced in an internal side of the ring and the nose of the hub is not provided with any teeth;

the ring and hub are separate parts which are rigidly attached together with the teeth and the nose in direct contact, the rigid attachment forming an assembly consisting of the hub and the ring to form a nut, and the ring is made of a material whose Vickers hardness is greater than that of a material in which the hub is made.

12. The method of claim 10 wherein the teeth and the ring interact to rigidly attach the ring and hub.

13. The method of claim 11 wherein the teeth and the hub interact to rigidly attach the ring and hub.

14. A method for manufacturing a vehicle braking system wherein:

a hub being machined so as to provide it with a nose and a tapped hole, a ring, the ring being a single piece and having at least one relief extending in a direction perpendicular to a main axis of the ring, is mounted on an outside of the nose of the hub, and the ring and hub are separate parts which are rigidly attached together to form an assembly consisting of the hub and the ring to form a nut wherein the rigid attachment between the hub and nut comprises an attachment which is rigid in rotation in two directions.

15. The method of claim 11 wherein the teeth are aligned substantially parallel to the main axis.

16. The method of claim 10 wherein the hardness of the ring as compared to the hub allows the teeth to penetrate into a surface of the ring.

17. The method of claim 11 wherein the hardness of the ring as compared to the hub allows the teeth to penetrate into a surface of the hub.

18. The method of claim 10 wherein the ring is provided without teeth on an internal side of the ring and the at least one set of teeth interact with the internal side of the ring to rigidly attach the ring and the hub.

* * * * *